(12) United States Patent
Foghetti et al.

(10) Patent No.: US 10,888,124 B2
(45) Date of Patent: Jan. 12, 2021

(54) METHOD AND INSPECTION UNIT FOR A HEATING MEMBER FOR AN ELECTRONIC CIGARETTE

(71) Applicant: G.D S.p.A., Bologna (IT)

(72) Inventors: Claudio Foghetti, Bologna (IT); Vincenzo Ponticelli, Monte san Pietro (IT); Carlo Moretti, Bologna (IT); Massimo Sartoni, Bologna (IT); Luca Federici, Bologna (IT)

(73) Assignee: G.D S.p.A., Bologna (IT)

( * ) Notice: Subject to any disclaimer, the term of this patent is extended or adjusted under 35 U.S.C. 154(b) by 194 days.

(21) Appl. No.: 16/089,608

(22) PCT Filed: Apr. 6, 2017

(86) PCT No.: PCT/IB2017/051979
§ 371 (c)(1),
(2) Date: Sep. 28, 2018

(87) PCT Pub. No.: WO2017/175166
PCT Pub. Date: Oct. 12, 2017

(65) Prior Publication Data
US 2019/0110518 A1    Apr. 18, 2019

(30) Foreign Application Priority Data
Apr. 8, 2016    (IT) .................. 102016000036195

(51) Int. Cl.
*A24F 47/00*    (2020.01)
*G01N 21/88*    (2006.01)

(52) U.S. Cl.
CPC ........ *A24F 47/008* (2013.01); *G01N 21/8851* (2013.01)

(58) Field of Classification Search
None
See application file for complete search history.

(56) References Cited

U.S. PATENT DOCUMENTS

| | | | |
|---|---|---|---|
| 9,968,135 B2 * | 5/2018 | Liu | ............ A24F 47/008 |
| 2003/0122371 A1 | 7/2003 | Rochford et al. | |
| 2004/0194792 A1 | 10/2004 | Zhuang et al. | |
| 2011/0308538 A1 | 12/2011 | Jarvis et al. | |

(Continued)

FOREIGN PATENT DOCUMENTS

| | | |
|---|---|---|
| AU | 2011211331 A1 | 3/2012 |
| CN | 1275349 A | 12/2000 |

(Continued)

OTHER PUBLICATIONS

Machine translation for CN 106455711 (Year: 2015).*

(Continued)

*Primary Examiner* — Qian Yang
(74) *Attorney, Agent, or Firm* — Whitmyer IP Group LLC (57) ABSTRACT

A method for inspecting a heating member for an electronic cigarette is disclosed. The method improves positioning of the heating member with respect to the power electrodes of an electronic cigarette so as to provide a more reliable electrical connection between the heating member and power electrodes. The method includes image processing to calculate a distance between coils of the heating element.

11 Claims, 7 Drawing Sheets

(56) References Cited

U.S. PATENT DOCUMENTS

| | | | |
|---|---|---|---|
| 2012/0067360 A1 | 3/2012 | Conner et al. | |
| 2014/0202474 A1 | 7/2014 | Peleg et al. | |
| 2014/0270730 A1 | 9/2014 | DePiano et al. | |
| 2015/0223522 A1 | 8/2015 | Ampolini et al. | |
| 2015/0289565 A1* | 10/2015 | Cadieux | A24F 47/002 131/328 |
| 2015/0291301 A1 | 10/2015 | Cadieux et al. | |
| 2016/0021930 A1 | 1/2016 | Minskoff et al. | |
| 2016/0144458 A1 | 5/2016 | Boldrini | |
| 2017/0109877 A1* | 4/2017 | Peleg | A24C 5/3412 |
| 2017/0258143 A1* | 9/2017 | Lederer | H05B 1/0297 |
| 2018/0177236 A1* | 6/2018 | Rosser | A24F 47/008 |
| 2018/0184722 A1* | 7/2018 | Murison | F04B 43/046 |

FOREIGN PATENT DOCUMENTS

| | | | |
|---|---|---|---|
| CN | 1864079 A | | 11/2006 |
| CN | 1934459 A | | 3/2007 |
| CN | 102655773 A | | 9/2012 |
| CN | 202566289 U | | 12/2012 |
| CN | 102959199 A | | 3/2013 |
| CN | 103720057 A | | 4/2014 |
| CN | 104010529 A | | 8/2014 |
| CN | 106455711 | * | 2/2015 |
| CN | 104937399 A | | 9/2015 |
| CN | 104955508 A | | 9/2015 |
| CN | 105163610 A | | 12/2015 |
| CN | 105188430 A | | 12/2015 |
| CN | 105473011 A | | 4/2016 |
| DE | 102013223076 A1 | | 5/2015 |
| EP | 2340728 A1 | | 7/2011 |
| JP | 3185504 B2 | | 7/2001 |
| WO | 2014088889 A1 | | 6/2014 |
| WO | 2015130615 A1 | | 9/2015 |

OTHER PUBLICATIONS

International Search Report & Written Opinion of the International Searching Authority Application No. PCT/IB2017/051979 Completed: Jun. 22, 2017, dated Jul. 13, 2017 12 pages.

Chinese Office Action; Application No. 201780018778.7, dated Sep. 3, 2020; 8 pages.

* cited by examiner

METHOD AND INSPECTION UNIT FOR A HEATING MEMBER FOR AN ELECTRONIC CIGARETTE

TECHNICAL FIELD

The present invention relates to a unit and to a method for inspecting a heating member for a device for generating inhalable vapors from a vaporizable liquid product. A device for generating inhalable vapors is commonly known as an electronic cigarette. In particular, reference is made an optical inspection method that processes an image of the heating member acquired by an image acquisition unit.

BACKGROUND

The term "device for generating inhalable products from a vaporizable liquid product", or also electronic cigarette, means a rechargeable battery device that is able to dispense to a user a dose of one or more substances by means of vapor. The substances can be of chemical, natural, aromatic vegetable or synthetic origin or be pharmaceuticals. Such substances are usually contained in a vaporizable liquid product, and i.e. in a solution comprising distilled water in addition to such substances.

The electronic cigarette comprises an outer casing, which is typically of tubular shape, for example in the shape of a cigarette or a pen, inside which are housed the vaporizable product, a heating member configured to heat and vaporize the vaporizable product and a battery for supplying electrically the heating member and for supplying the energy necessary for the operation of the electronic cigarette. The heating member is also commonly known as an "atomizer" or "vaporizer".

With 1 in FIGS. 1 to 5 an electronic cigarette has been indicated that is of known type, for example as shown by WO2014088889 and by WO2015130615, comprising a reusable control body 2, i.e. which can be used several times, of cylindrical shape. The control body contains, amongst other things, a battery (not shown) and a controller (not shown) that controls the operation of the electronic cigarette.

Figure 1:
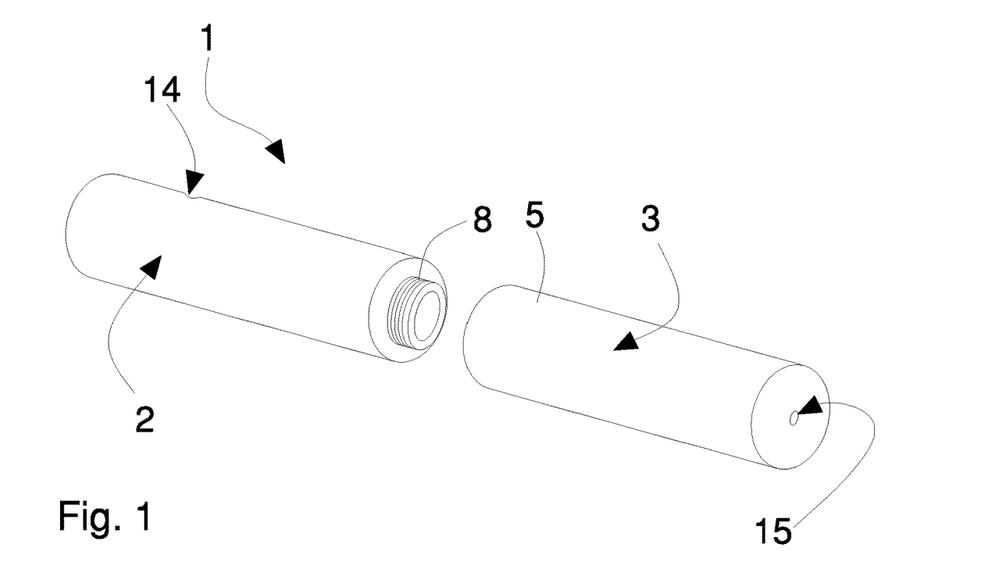
FIG. 1 is a perspective and schematic view of a device for generating inhalable vapors of the prior art, and i.e. an electronic cigarette, in which the electronic cigarette is provided with a control body and with a cartridge which are illustrated in a separate non-operating configuration.

The electronic cigarette 1 further comprises a cartridge 3 that is also of cylindrical shape that is screwed to the control body 2 by a threaded connector 8. The cartridge 3 is single-use, i.e. disposable, usable just once and then has to be replaced.

The cartridge 3 of the electronic cigarette 1 comprises a support base 4 (FIGS. 2 and 3), which consists of electrically insulating plastics and is at least electrically insulating, and is at least partially inserted inside a metal shell 5 having an internal threaded connector (not shown) that is able to couple with the corresponding threaded connector 8 of the control body 2 of the electronic cigarette 1. The support base 4 comprises two power electrodes, in detail a first power electrode 6a and a second power electrode 6b, arranged on the sides and a signal electrode (not shown in the enclosed figures) arranged between the two power electrodes 6a, 6b. The power electrodes 6a, 6b have an axial extent that is greater than the signal electrode.

To the two power electrodes 6a, 6b, the heating member (FIG. 4) is connected electrically, the heating member comprising a continuous wick 9, which is made of an electrically insulating material, and a continuous heating element 10, i.e. of a metal wire that is wound in coils about the wick 9 and thus makes a heat resistance.

The wick 9 is made of one or more materials that are able to convey a fluid in capillary manner, for example natural or synthetic fibers, like cellulose, polyester, glass fiber or a combination thereof.

The heating element 10 surrounds, and is wound around, a portion of the wick 9 that defines a vapor-generating zone of the cartridge 3 and the power electrodes 6 are coupled therewith by welding, as will be seen better below.

Between the two power electrodes 6a, 6b, a supporting body 12 of ceramic (or similar) material is arranged, which rests laterally on both the power electrodes 6a, 6b and carries centrally an electronic circuit (not shown), which is electrically connected to the signal electrode and is in communication, when the control body is coupled with the cartridge, with the controller of the electronic cigarette to perform a plurality of specific functions. The supporting body 12 also acts as an insulating spacer to maintain the two power electrodes 6a, 6b well separated from one another.

Inside the casing 5, a hygroscopic buffer (not shown) is also arranged, for example a wadding buffer that is impregnated with the vaporizable product and can be connected to a tank of vaporizable product (not shown) or act itself as a tank. The hygroscopic buffer, for example of cylindrical tubular shape, is arranged around the two power electrodes 6a, 6b, and is in contact at least with ends of the wick 9, in particular is in contact with a first end 11a and a second end 11b arranged on opposite sides of the wick 9. The wick 9 is in fact configured to convey in capillary manner the volatizable product from the ends 11a and 11b in contact with the hygroscopic buffer up to the vapor-generating zone, at which the heating element 10 acts.

A hole 14 on a wall of the control body enables air to enter inside the control body 2. A hole 15 on a wall of the shell 5, at one end of the cartridge 3, acts as a mouthpiece and is provided to make the generated vapors exit.

In use, when the control body 2 and the cartridge 3 are arranged joined in an operating configuration, the threaded connector 8 of the control body 2 couples with the corresponding connector (not shown) of the cartridge 3 to connect the power electrodes 6a, 6b electrically to the battery and thus make possible the activation of the heating member. When a user aspirates from the hole 15 of the mouthpiece, air is introduced from the hole 14 of the control body 2 and the aspiration is detected by the processor of the latter, which activates the heating member to generate vapor from the volatizable product. More precisely, the air aspirated from the hole 14 on the control body mixes with the vapor generated by the heating member and the mixture of vapor thus obtained is conveyed to the mouthpiece and can exit from the hole 15 arranged at the end of the shell 5 to be inhaled by the user.

Figures 3, 4, 5:
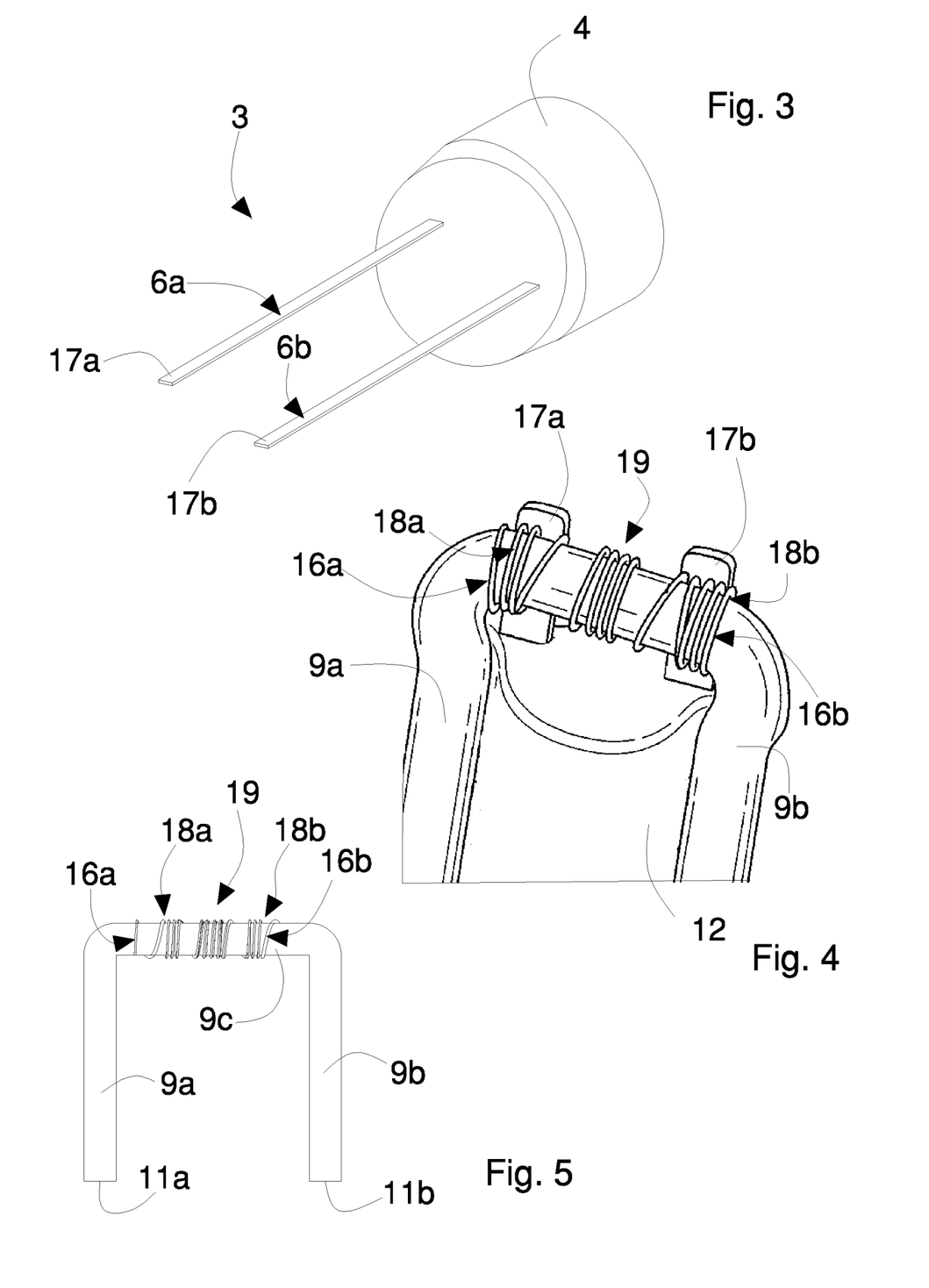
FIG. 4 shows a perspective and schematic view of a different embodiment of the cartridge of the FIG. 1 with details removed for the sake of clarity.
FIG. 5 is a schematic frontal view of a heating member of the cartridge of FIG. 1, in a final configuration in which it is folded into a U.

As illustrated in detail in FIGS. 4 and 5, the wick 9 is folded in a U and has two outer branches that are parallel to one another, in detail a first outer branch 9a and a second outer branch 9b, and a central section 9c placed between the outer branches 9a and 9b.

Figure 2:
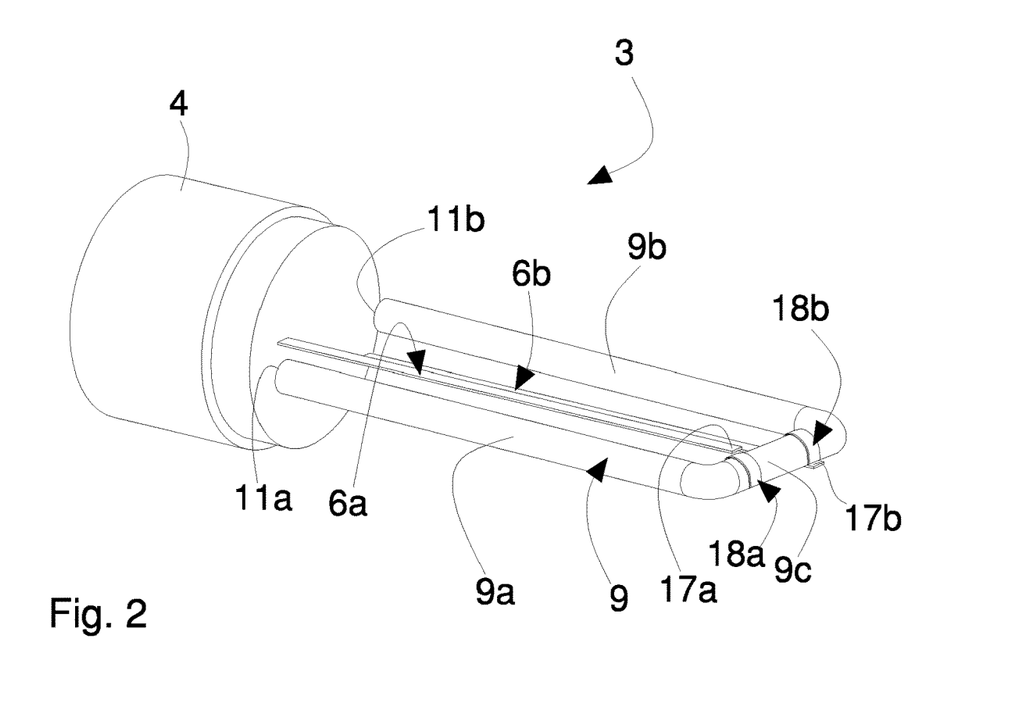
FIGS. 2 and 3 are two different perspective and schematic views of the cartridge of the FIG. 1 with details removed for the sake of clarity.

As shown in FIGS. 2 and 4, the outer branches 9a and 9b of the wick 9 extend along the first and the second power electrode 6a and 6b and terminate with the first end 11a and with the second end 11b.

The heating element 10, wound in coils about the wick 9, is positioned at the central section 9c of the latter arranged between the outer branches 9a and 9b. Between the coils wound about the wick 9 it is possible to identify at least two end coils, in detail a first end coil 16a and a second end coil 16b that are arranged to contact respective contact portions, in detail a first contact portion 17a and a second contact portion 17*b* respectively of the power electrodes 6*a*, 6*b*. Preferably, each contact portion 17*a*, 17*b* of the respective power electrode 6*a*, 6*b* is arranged at the end of the power electrode 6*a*, 6*b* and is configured to contact one or more coils of the heating element 10. The contact portions 17*a*, 17*b* are fixed to the coils by welding.

Alternative embodiments of the heating member can be provided and also alternative embodiments of the coupling between heating members and contact portions of the power electrodes.

The heating member, as shown in FIG. 2 and in FIGS. 7 to 10, can be wound about the wick 9*c* in a configuration that provides two groups of contact coils 18, in detail a first group of contact coils 18*a* and a second group of contact coils 18*b*, that have adjacent coils that are close are substantially in contact together, and a group of heating coils 19, which are arranged between the coils of the first contact group 18*a* and the coils of the second contact group 18*b* and are spaced further apart than the coils of the first group 18*a* and of the second group 18*b*. In detail, in FIG. 2 the coils are schematized for highlighting exclusively the first group of contact coils 18*a* and the second group of contact coils 18*b*.

Typically, the first group of contact coils 18*a* and the second group of contact coils 18*b* are arranged respectively at (or near), and respectively delimited by, respectively the first end coil 16*a* and the second end coil 16*b* so as to represent a respective first terminal and second terminal of the heating element configured to contact respectively the first power electrode 6*a* and the second power electrode 6*b* of the cartridge 3.

Figure 6:
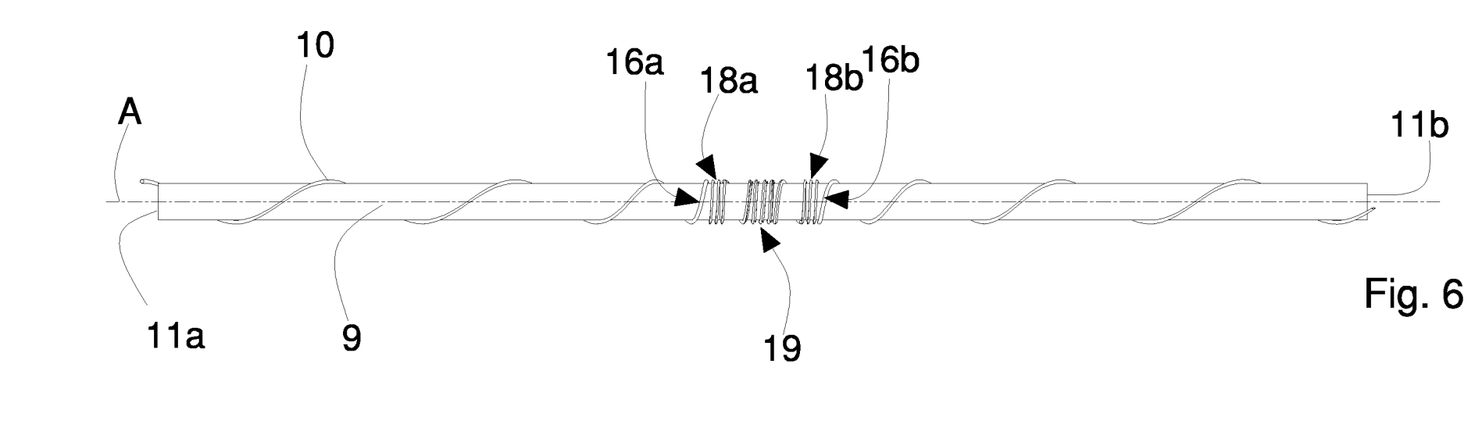
FIG. 6 is a schematic frontal view of the heating member of the FIG. 5, in an initial configuration in which it is straight.

As illustrated in FIG. 6, also further coils can be provided between the first end 11*a* of the wick 9 and the first end coil and between the second end coil 16*b* and the second end 11*b* of the wick 9 of the heating member, that nevertheless do not participate in the operation of the heating member and are thus not considered below.

More than one coil of the first group of contact coils 18*a* is fixed to the first contact portion 17*a* and more than one coil of the second group of contact coils 18*b* is fixed to the second contact portion 17*b* in order to improve the electrical connection between the heating element 10 and the power electrodes 6*a*, 6*b* increasing the contact surface between the power electrodes 6*a*, 6*b* and the heating element 10.

The heating action of the heating member is entrusted to the group of heating coils 19, extending in a central portion of the central section 9*c* of the wick 9, between the first group of contact coils 18*a* and the second group of contact coils 18*b*.

The heating coils 19 can be evenly distributed between the coils of the first group of contact coils 18*a* and the coils of the second group of contact coils 18*b* as shown in FIGS. 7 to 10 or, alternatively, according to a version of the heating member shown in FIGS. 4 to 6, the heating coils 19 can be brought near one another (but not in contact between them to avoid a short circuit) and arranged in a central zone of the central portion 9*c*.

The group of heating coils 19, arranged at a close distance centrally in the heating member are in this manner configured to concentrate centrally the heat produced.

It should then be noted that the heating element 10 is wound in coils about the wick 9 and that adjacent coils, along a longitudinal axis of the central portion 9*c* thereof, are arranged at a variable distance from one another in relation to the need to make groups of contact coils 18*a* and 18*b* or a group of heating coils 19.

On the other hand, for the coupling between the heating member and the contact portions 17*a*, 17*b* of the power electrodes 6*a*, 6*b*, it should be noted that the first end 17*a* and the second end 17*b* can be welded on diametrically opposite sides to the wick 9, as shown in FIG. 2, or on the same side, as shown in FIG. 4, in relation to the arrangement of the contact portions 17*a*, 17*b* of the power electrodes 6*a*, 6*b* deemed to be more convenient in a designing step of the cartridge 3.

Both if the first end 17*a* and the second end 17*b* are welded on the same side or on diametrically opposite sides of the wick, regardless of the configuration of the heating coils 19, precise coupling is necessary between the power electrodes 6*a*, 6*b* and the terminals 18*a* and 18*b* of the heating member to ensure appropriate vaporization of the vaporizable product and thus correct operation of the electronic cigarette.

Currently, for the production of a cartridge as described above, the heating member is picked up that comprises the insulating wick 9, in a final configuration in which it is already shaped into a U and is provided with the heating element 10 already wound in coils about the heating element 10, and then the terminals 18*a*, 18*b*, of the heating member are rested on the power electrodes 6*a*, 6*b* of the cartridge 3 being formed. Once the heating member has been rested on the power electrodes 6*a*, 6*b*, of the cartridge 3 being formed, two welds are made between the terminals 18*a*, 18*b* of the heating member and the corresponding power electrodes 6*a*, and 6*b* to establish a stable electrical connection. The packaging machine for producing the cartridge (not shown) further comprises, as shown by application ITBO2014A000664 of the same applicant, a folding device of the heating member which receives a heating member, in an initial configuration in which it is straight, and folds into a U the heating member to arrange the heating member in the final configuration, before coupling the heating member with the power electrodes 6*a*, 6*b*.

The heating member, in the initial configuration in which it is straight (shown in FIG. 6), is obtained by cutting transversely a wire-shaped sequence of heating members wound in a coil (not shown) and separating a heating member cut from the remaining wire-shaped sequence.

The position in which the heating member rests on the power electrodes 6*a*, 6*b* is critical for the correct operation of the electronic cigarette 1 inasmuch as a poor (or even absent) electrical connection between the power electrodes 6*a*, 6*b* and the terminals 18*a*, 18*b* of the of the resistance carried by the insulating wick 10 makes it impossible to vaporize the volatile substance and thus makes the cartridge 3 unusable and faulty.

Nevertheless, at the moment of the coupling between power electrodes 6*a*, 6*b* and terminals 18*a*, 18*b*, of the resistance, the position of the power electrodes 6*a*, 6*b* is preset, inasmuch, in the cartridge 3 being formed, the power electrodes 6*a*, 6*b* are already fixed rigidly to the support base 4. Consequently, the quality of the electrical connection depends exclusively on the precision with which positioning of the terminals of the heating member with respect to the power electrodes 6*a*, 6*b* is carried out.

In order to position the terminals 18*a*, 18*b*, an optical inspection method is known for inspecting the heating member, before the heating member rests on the power electrodes 6*a*, 6*b* and thus before the latter are welded to the terminals.

In detail, one of the two terminals, the first group of contact coils 18*a* or the second group of contact coils 18*b*, of the heating member is inspected visually and the inspected terminal is positioned at a geometric center of gravity of the corresponding power electrode intended for contacting the terminal.

In order to carry out this positioning, an inspection unit is used comprising an optical assembly consisting of an image acquisition optical apparatus and of an illuminator, suitable for framing the heating member and for processing an image that is thus acquired to identify a group of contact coils and calculate the geometric center of gravity thereof.

The term geometric center of gravity means the "average position" of all the points thereof or the arithmetical average of the positions of each one thereof.

The phrase "image acquisition optical apparatus" means an image acquisition optical apparatus that is able to acquire images of an object, and in particular to process such images so as to extract therefrom characteristics of interest, for example geometric and/or shape characteristics, of this object. The acquired images can be color images or black and white images and from these images information on the color (tone, saturation, etc.) or respectively on the level of grey and on the luminous intensity can be extracted.

The optical apparatus usually comprises a body on which an electronic sensor is arranged, for example an alignment or array of photosensitive elements of two-dimensional linear or matrix type, for example of CCD or CMOS type, and appropriate optical receiving means fixed to the body, for example an objective consisting of one or more lenses, by which the sensor is suitable for receiving the light diffused by the object to be acquired. The number of photosensitive elements of the electronic sensor is matched by the number of pixels or of the punctiform elements that constitute the representation of a raster image or bitmap in the memory of the optical apparatus. It should be noted that a resolution image of (n*m) pixels can be obtained by a single acquisition using a two-dimensional or matrix sensor of (n*m) photosensitive elements.

A control device is comprised in an optical apparatus to command the acquisition of the image, the switching-on of the illuminator and also, in some applications to process the acquired image in order to extract features of interest from the image and to communicate the result of the optical inspection to an external control system. Optical apparatuses of this type are known as linear or matrix television cameras or cameras, and if they are able to process the acquired image to analyse information of interest they are also known as "smart cameras".

The result of the optical inspection performed by the inspection unit is communicated to an external control system, for example the system for controlling the packaging machine of the cartridge that is suitable for coupling the heating member with the power electrodes 6, by a high data transmission speed communication network of Ethernet type or of another type. Alternative communication means can also be provided that are made by a set of digital signals entering and exiting the optical apparatus, connected to analogue digital signals respectively existing and entering the control system of the packaging machine.

The control system controlling the cigarette packaging machine is thus able to adjust the positioning of the inspected heating member to make the center of gravity of one of the two inspected terminals coincide with the corresponding power electrode.

One of the two terminals is thus always coupled correctly, but this is not unfortunately guaranteed for both terminals because of the extreme variability of the shape of the terminals.

As is clear in FIGS. 7 to 10, it can in fact be noted that winding the heating element 10 into coils around the wick 9 and rotating the heating member around a longitudinal axis S thereof determines the shape of the first group of contact coils 18a and of the second group of contact coils 18b in each of the different heating members shown.

Figure 7:
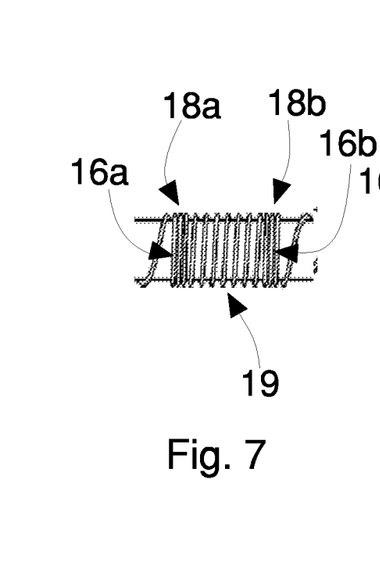
FIGS. 7 to 10 show respective detailed schematic views of different heating members, having different configurations of the coils wound about the wick.
Figures 8, 9:
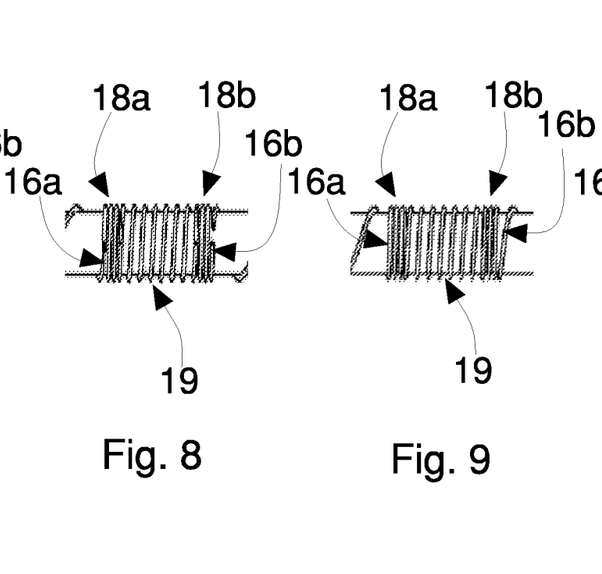
Figure 10:
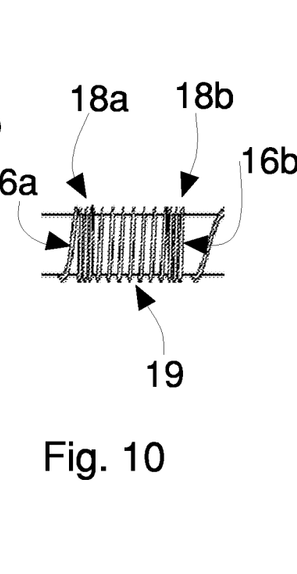

If, in fact, the first group of contact coils 18a is considered that includes the first end coil 16a, it is possible to note that the first end coil 16a is substantially in contact with and parallel to the remaining coils of the first group of contact coils in FIGS. 7 and 9 whereas it is tilted with respect to the remaining coils of the first group of contact coils 18a in FIGS. 8 and 10. In these last figures it can be noticed how the first end coil 16a is in contact with the remaining coils above whereas it is far from the remaining coils below (above and below are considered by viewing frontally the winding of the heating element in coils).

Also, considering the first group of contact coils 18a, a last coil can be noticed, before the coils of the group of heating coils, which is not parallel but is tilted in FIGS. 8 and 9 and is in particular in contact with the remaining coils of the first set below whereas it is on the other hand spaced apart above.

Similar anomalies can also be seen in the second group of contact coils shown in FIGS. 7 to 10, inasmuch as constructional defects may be present in the heating member because of imprecise winding of the heating element that gives rise to groups of contact coils with "open" coils, that are i.e. not compact or are even tilted.

The great variability in the shape of the groups of contact coils and of the dimension of the groups of contact coils, which can change from one heating member to the next, consequently determines great variability in the position of the calculated center of gravity and thus of the position at which one of the two terminals is coupled with the corresponding electrode.

If the electrical contact of the heating member with one of the two electrodes is thus always ensured, there cannot be certainty of the electrical contact between the heating member and the remaining electrode. In fact, the other terminal of the heating member could be positioned shifted with respect to the remaining electrode, thus making a poor electrical connection or, in the worst case in which no contact coil of the heating element makes contact with the corresponding electrode, an absent electrical connection.

SUMMARY

The object of the present invention is to provide an inspection method that is free of the drawbacks disclosed above or that is at the same time easy and cheap to make.

A further object of the present invention is to provide a method for inspecting a heating member for an electronic cigarette that permits precise positioning of the heating member with respect to the power electrodes of an electronic cigarette so as to ensure a reliable electrical connection between the heating member and power electrodes.

According to the present invention, an inspection method is provided, according to what is claimed in the attached claims.

BRIEF DESCRIPTION OF THE DRAWINGS

The present invention will now be disclosed with reference to the attached drawings, which illustrate some embodiments thereof by way of non-limiting example in which.

DETAILED DESCRIPTION

In this description, identical elements in common to the illustrated embodiments are indicated by the same numbering.

Figure 11:
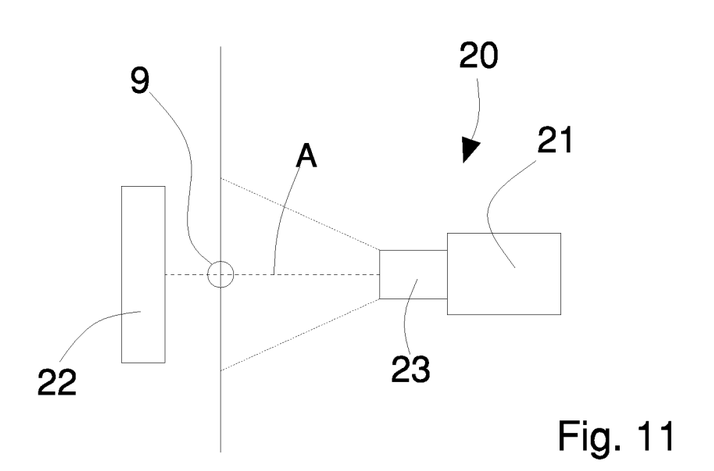
FIG. 11 shows a schematic view of an inspection unit of a heating member, according to the present invention.
Figure 12:
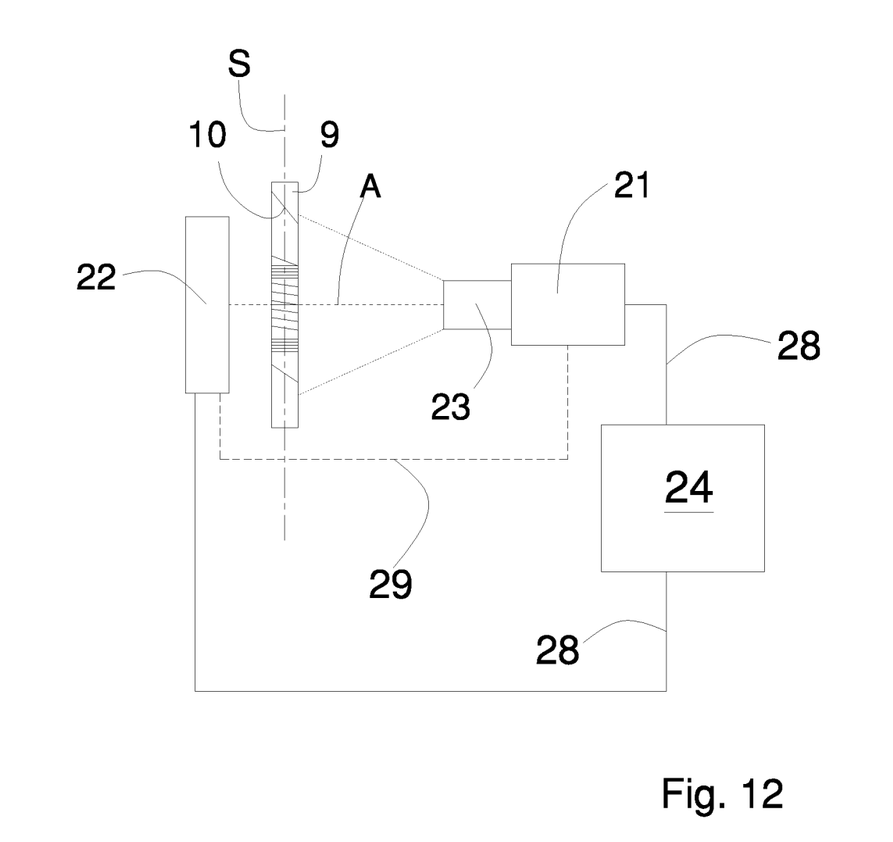
FIG. 12 shows a schematic top view of the inspection unit of FIG. 11.

As illustrated in FIGS. 11 and 12, a unit for inspecting a heating member for a device for generating inhalable vapors from a vaporizable liquid product is indicated overall by the number 20.

A device for generating inhalable vapors of known type, commonly known as an electronic cigarette, has already been disclosed previously with reference to FIGS. 1 to 10 and, for the sake of brevity, this description will not be repeated in its entirety here. See the previous paragraphs for possible details that are not explicitly indicated below.

The electronic cigarette comprises a control body 2 and a disposable cartridge 3, that, in use, are arranged assembled in an operating configuration.

The disposable cartridge 3 comprises a heating member, for which an inspection method is provided that will be illustrated below.

The heating member comprises a continuous wick 9, made of one or more materials that is able to convey a fluid in a capillary manner, and a continuous heating element 10 wound in coils around the wick 9, which makes a resistance.

The heating element 10 surrounds, and is wound about, a portion of the wick 9 that defines a vapor-generating zone of the cartridge 3 and is coupled therewith, for example by welding power electrodes of the cartridge, in detail a first power electrode 6a and a second power electrode 6b.

As illustrated in detail in FIGS. 4 and 5, the wick 9 is folded in a U and has two outer branches that are parallel to one another, in detail a first outer branch 9a and a second outer branch 9b, and a central section 9c placed between the outer branches 9a and 9b.

The heating element 10, wound in coils around the wick 9, is positioned at the central section 9c of the latter arranged between the outer branches 9a and 9b.

The heating element 10 is wound about the wick 9 in a configuration that provides two groups of contact coils 18, in detail a first group of contact coils 18a and a second group of contact coils 18b, that represent a respective first terminal and second terminal of the heating element 10 configured to contact respective power electrodes 6, in detail the first power electrode 6a and the second power electrode 6b of the cartridge 3.

The heating element 10 is further wound around the wick in a group of heating coils 19, which are arranged between the coils of the first contact group 18a and the coils of the second contact group 18b and are spaced further apart than the coils of the first group 18a and of the second group 18b.

Typically, the first group of contact coils 18a and the second group of contact coils 18b have, in fact, adjacent coils that are brought together and are substantially in contact with one another and are arranged respectively at (or near, respectively a first end coil 16a and a second end coil 16b, which delimit externally each group of contact coils 18a and 18b, opposite the heating coils 19.

In detail, the first group of contact coils 18a and the second group of contact coils 18b contact respective contact portions of the power electrodes, in detail, the first group of contact coils 18a contacts a first contact portion 17a and the second group of contact coils 18b contacts a second contact portion 17b of the power electrodes 6a, 6b. Preferably, the contact portions of the power electrodes are arranged at the ends of the power electrodes and are configured to contact one or more coils of the heating element 10.

The contact portions are fixed to the coils by welding.

The inspection unit 20, which can for example be advantageously integrated into a machine for making a cartridge 3 for an electronic cigarette, can for example be connected by communication means (not shown) to the control apparatus (not shown) of the machine for making the cartridge 3, typically the machine control unit, to exchange data and/or commands with the control device itself. The inspection unit 20 can for example receive an inspection start command from the machine control apparatus and supply to the control apparatus a result of the inspection. Alternatively, the inspection unit 20 can independently activate the inspection of the heating member and provide the result of the inspection to the control apparatus.

As said previously, the control apparatus can reject directly a heating member that is deemed to be non-compliant with the requested quality requirements, as soon as the heating member reaches a rejection station, or can communicate the result of the inspection to the folding device of heating members that is suitable for folding into a U the straight heating members supplied thereto.

As shown by FIGS. 11 and 12, the inspection unit 20 comprises at least one optical assembly configured to inspect the heating member, in particular configured to process an acquired image, obtained by framing the heating member. The optical assembly is further configured to optionally acquire the image to be processed.

The optical assembly comprises an image acquisition optical apparatus 21, configured to acquire the image obtained by framing the heating member, and an illuminator 22, configured to illuminate the heating member during image acquisition. The heating member is interposed between the illuminator 22 and the optical apparatus 21 along an optical axis A of the optical apparatus 21.

Each optical apparatus 21 further comprises a respective objective 23 configured to frame the heating member, or at least the central section 9c of the wick 9 at which the heating element 10 is wound if the heating member is in a final configuration in which it has already been folded into a U, when the heating member is within the field of view of the optical apparatus 21. Alternatively, the objective 23 of the optical apparatus 21 is configured to frame the heating member in the initial configuration in which it is straight, or at least a vapor-generating zone of the cartridge 3 at which the heating element 10 surrounds, and is wound about, a portion of the wick 9, as illustrated in FIG. 12.

It is pointed out that field of view means an acquisition field of the optical apparatus 21, or a preset area within which the images of the heating member can be acquired, which is within a focusing range and for which, along the optical axis A of the objective 23 it is possible to define a set depth of field.

If the wick 9 is made of glass fiber, which is transparent to light, it should be noted that the illuminator 22 is positioned in such a manner as to light the heating member from behind during an acquisition such that the coils defined by the heating element can be sharp with respect to a background when they are acquired in an image. The configuration of the optical parameters of the optical apparatus 21, such as for example a diaphragm opening, a focus distance or a zoom, have to be carefully selected in a suitable manner.

The inspection unit 20 further comprises a processing device 24 configured to identify in the processed image a first closed region 25a associable to the first group of contact coils 18a of the heating element wound in coils around the wick. As said previously the first group of contact coils 18a represents the first contact terminal configured to contact the respective first power electrode 6a of the cartridge 3.

The processing device 24 is further configured to identify in the processed image a second closed region 25b associable to the second group of contact coils 18b of the heating element. As said previously, the second group of contact coils 18b represents the second contact terminal configured to contact the respective second power electrode 6b of the cartridge 3.

The processing device 24 is configured to calculate, for each closed region, in detail for the first closed region 25a and for the second closed region 25b, a respective reference center of the coils, in particular it is configured to calculate a first reference center of the coils 26a calculated for the first closed region 25a and a second reference center of the coils 26b calculated for the second closed region 25b.

The processing device 24 is further suitable for calculating a reference center 27 of the heating member arranged between the first group of contact coils 18a and the second group of contact coils 18b (i.e. between the first closed region 25a and the second closed region 25b), starting from the first reference center of the coils 26a calculated for the first closed region 25a and from the second reference center of the coils 26b calculated for the second closed region 25b, so as to use the reference center 27 of the heating member to be able to precisely couple the first and second terminal of the heating member during a production step of the cartridge 3, respectively with the first power electrode of the cartridge 6a and with the second power electrode 6b of the cartridge 3.

It should further be noted that, as illustrated schematically in FIG. 12, the optical apparatus 21 and the processing device 24 are connected together by a communication network 28, for example of Ethernet cable or WiFi type. The illuminator 22 is on the other hand preferably connected directly to the optical apparatus 21 by respective digital input/output signals that can be provided optionally, as illustrated by the dashed lines, also between the processing device 24 and the illuminator 22.

It should further be noted that the optical apparatus 21 is suitably arranged with respect to the heating member to be examined, so that the inspection can take place. In detail, the optical apparatus 21 is positioned frontally with respect to the heating member or at least with respect to the central portion 9c of the wick at which the heating element is wound in coils, such that the optical axis A is perpendicular to a longitudinal axis of the central portion 9c to acquire a frontal image of the wick 9.

In use, the inspection unit 20 receives an inspection start command from the control apparatus of the machine for making the cartridge 3, or activates independently, according to a preset inspection logic, the inspection of the heating member.

Figure 13:
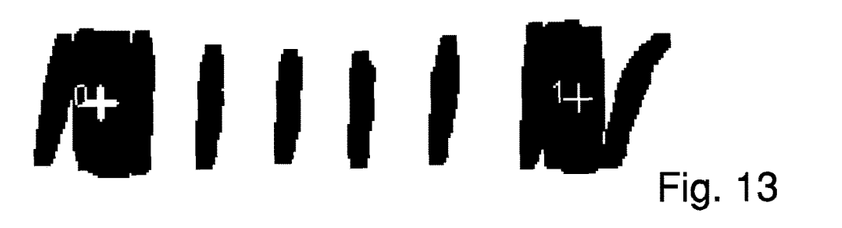
FIG. 13 shows an image of a heating member, as processed, by the method of the present invention after acquisition of the image by the inspection unit of FIG. 11.

The inspection method for inspecting the cartridge 3 provides the following steps:
  processing an acquired image (FIG. 13), being obtained by framing the heating member;
  identifying in the processed image a first closed region 25a (FIG. 14) being associable to a first group of contact coils 18a of a heating element 10 wound in coils about a wick 9, the first group of contact coils 18a representing a first contact terminal configured to contact a respective first power electrode 6a of the cartridge 3;
  identifying in the processed image a second closed region 25b (FIG. 19) being associable with a second group of contact coils 18b of the heating element, the second group of contact coils 18b representing a second contact terminal configured to contact a respective second power electrode 6b of the cartridge 3;
  calculating, for each closed region, in detail the first closed region 25a and the second closed region 25b, a respective reference center of the coils (FIGS. 14 and 19), in detail calculating the first reference center of the coils 26a of the first closed region 25a and the second reference center of the coils 26b of the second closed region 25b;
  calculating a reference center 27 of the heating member (FIG. 20), being arranged between the first group of contact coils 18a and the second group of contact coils 18b, starting from the first reference center of the coils 26a and from the second reference center of the coils 26b, in order to use the reference center 27 of the heating member to be able to precisely couple the first and second terminal of the heating member, during a production step of the cartridge 3, respectively to the first power electrode 6a and to the second power electrode 6b of the cartridge (3).

The reference center 27 of the heating member is calculated as a medium point between the first reference center 26a of the coils and the second reference center 26b of the coils.

For each closed region (FIGS. 14 and 19), and i.e. for the first closed region 25a and for the second closed region 25b, the step of calculating a respective reference center of the coils, respectively the first reference center of the coils 26a for the first closed region 25a and the second reference center of the coils 26b for the second closed region 25b, includes the following steps:

calculating a center of gravity for each closed region, in detail respectively a first center of gravity 30a of the closed region 25a and a second center of gravity 30b of the second closed region 25b;

identifying an outline delimiting the respective closed region, in detail a first outline 25'a delimiting the first closed region 25a and a second outline 25'b delimiting the second closed region 25b;

identifying a convex quadrangle being inscribed in the respective outline that is a function of the respective calculated center of gravity and is associable with adjacent coils, in detail a first convex quadrangle 31a inscribed in the first outline 25'a that is a function of the respective first center of gravity 30a and is associable to adjacent coils, and a second convex quadrangle 31b inscribed in the second outline 25'b which is a function of the respective second center of gravity 30b and is associable with adjacent coils;

the reference center of the coils being calculated as an intersection between opposite diagonals of the convex quadrangle, i.e. the first reference center of the coils 26a being calculated as an intersection between opposite diagonals of the first convex quadrangle 31a and the second reference center of the coils 26b being calculated as an intersection between opposite diagonals of the second convex quadrangle 31b.

The definition of a "center of gravity" of a closed region has been provided previously and is not repeated here.

Alternatively, preferably, the reference center of the coils is calculated as a center of gravity of the convex quadrangle, i.e. the first reference center of the coils 26a is calculated as a center of gravity of the first convex quadrangle 31a and the second reference center of the coils 26b is calculated as a center of gravity of the second convex quadrangle 31b.

Figure 14:
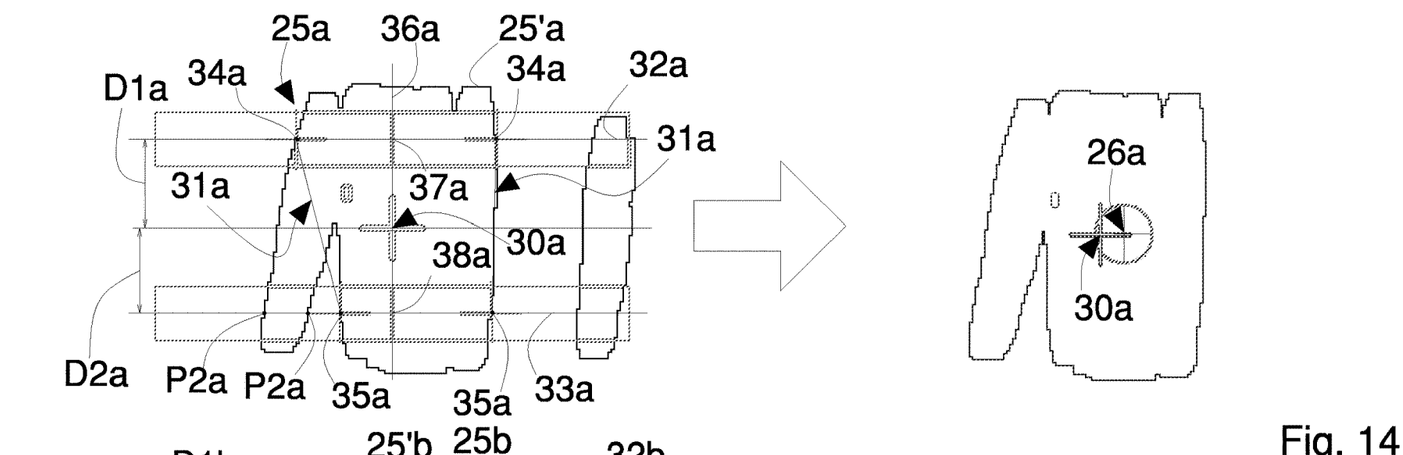
FIG. 14 shows a first region, associable with a first group of contact coils, identified in the image of FIG. 13, which is processed according to the inspection method of the present invention to calculate a respective first reference center.
Figure 15:
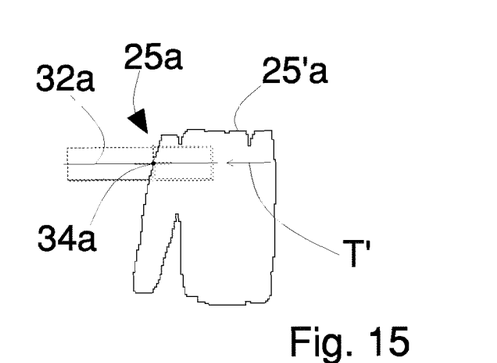
FIGS. 15 to 18 show the first region, as processed in subsequent steps of the method of the present invention.
Figure 16:
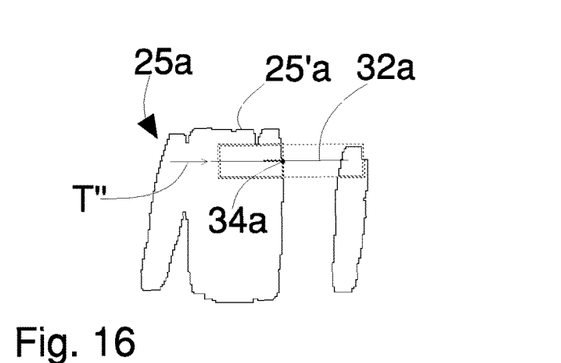
Figure 17:
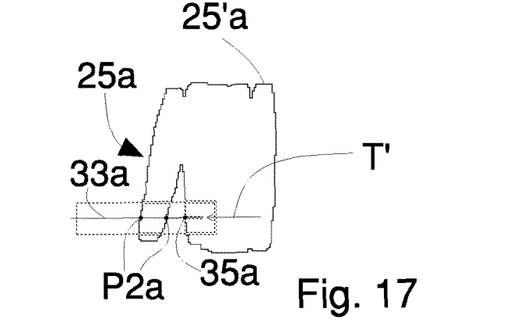
Figure 18:
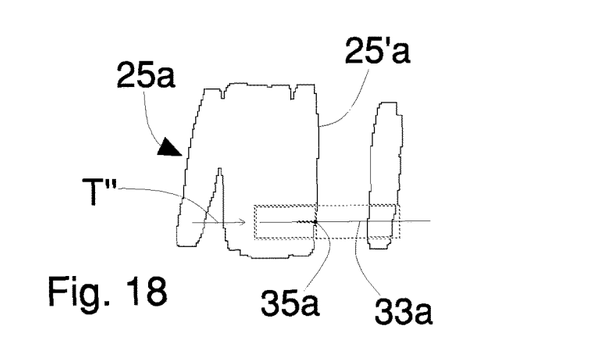

For each identified closed region, i.e. the first closed region 25a and the second closed region 25b, to identify the respective convex quadrangle, i.e. the first and the second convex quadrangle 31a and 31 b, the inspection method comprises the following steps:

selecting an upper line and a lower line arranged on opposite sides to the respective center of gravity respectively at an upper distance and at a lower distance from the center of gravity, in detail selecting a first upper line 32a and a first lower line 33a arranged on opposite sides to the first center of gravity 30a and a second upper line 32b and a second lower line 33b, arranged on opposite sides to the second center of gravity 30b, which are parallel to a longitudinal axis S of the wick 9, in particular horizontal; the first upper line 32a being arranged at a first upper distance D1a from the first center of gravity 30a and the second upper line 32b being arranged at a respective second upper distance D1b from the second center of gravity 30b, the first lower line 33a being arranged at a first lower distance D2a from the first center of gravity 30a and the second lower line 33b being arranged at a second lower distance D2b from the second center of gravity 30b;

identifying an upper set of points, in detail respectively a first upper set of points P1a and a second upper set of points P1b, which are intersection points between the respective outline and the respective upper line, i.e. the first upper set of points P1a has intersection points between the first outline 25'a and the first upper line 32a and the second upper set of points P1b has intersection points between the second outline 25'b and the second upper line 32b;

identifying a lower set of points, in detail respectively a first lower set of points P2a and a second lower set of points P2b, which are intersection points between the respective outline and the lower line, i.e. the first lower set of points P2a has intersection points between the first outline 25'a and the first lower line 33a and the second lower set of points P2b has intersection points between the second outline 25'b and the second lower line 33b;

selecting two upper points between the points of the upper set and two lower points between the points of the lower set as vertices of the convex quadrangle, in detail respectively two upper points 34a between the points of the first upper set P1a in the first region 25a (which, as is clear in FIG. 14, are in this specific case only the two upper points of the upper set of points P1a) and two lower points 35a between the points of the first lower set P2a as vertices of the first convex quadrangle 31a and two upper points 34b in the second region 25b between the points of the second upper set P1b, and two lower points 35b between the points of the second lower set P2b as vertices of the second convex quadrangle 31b.

The first upper distance D1a from the first center of gravity 30a, the second upper distance D1b from the second center of gravity 30b, the first lower distance D2a from the first center of gravity 30a and the second lower distance D2b from the second center of gravity 30b are processing parameters of the method of the present invention, which can be configured.

As the type of cartridge for an electronic cigarette varies, heating members of different type can be in fact provided, with different dimensions of the wick 9 and of the windings in coils of the heating element 10, for which it is necessary to determine accurately, during the step of designing the cartridge, for each closed region, the distances listed above from the respective center of gravity.

Once the type of heating member to be inspected has been established and the first upper distance D1a, the second upper distance D1b, the first lower distance D2a and the second lower distance D2b have been established, it should be noted that in each closed region, the convex quadrangle inscribed therein is a function only of the calculated center of gravity and varies therewith. In detail, the first convex quadrangle 31a is a function of the first calculated center of gravity 30a and the second convex quadrangle 31b is a function of the second calculated center of gravity 30b. Preferably, the first upper distance D1a and the second upper distance D1b have the same value and also the first lower distance D2a and the second lower distance D2b have the same value.

The convex quadrangle that is identifiable in each closed region, i.e. the first convex quadrangle 31a in the first closed region 25a and the second convex quadrangle 31b in the second closed region 25b, has at least two parallel sides and is thus at least one trapezium, which encloses a respective group of contact coils 18a, 18b the coils of which are grouped together and compact, near to one another. By associating respectively the first convex quadrangle 31a with the first group of contact coils 18a and the second convex quadrangle 31b with the second group of contact coils 18a, it can be noted that the "open" coils are excluded, which, as explained previously, are only partially in contact below or above the coils of the respective group.

Each convex quadrangle delimits, in other words, a portion of the respective closed region inside which groups of coils are present that are adjacent to and contiguous with one another.

Figure 19:
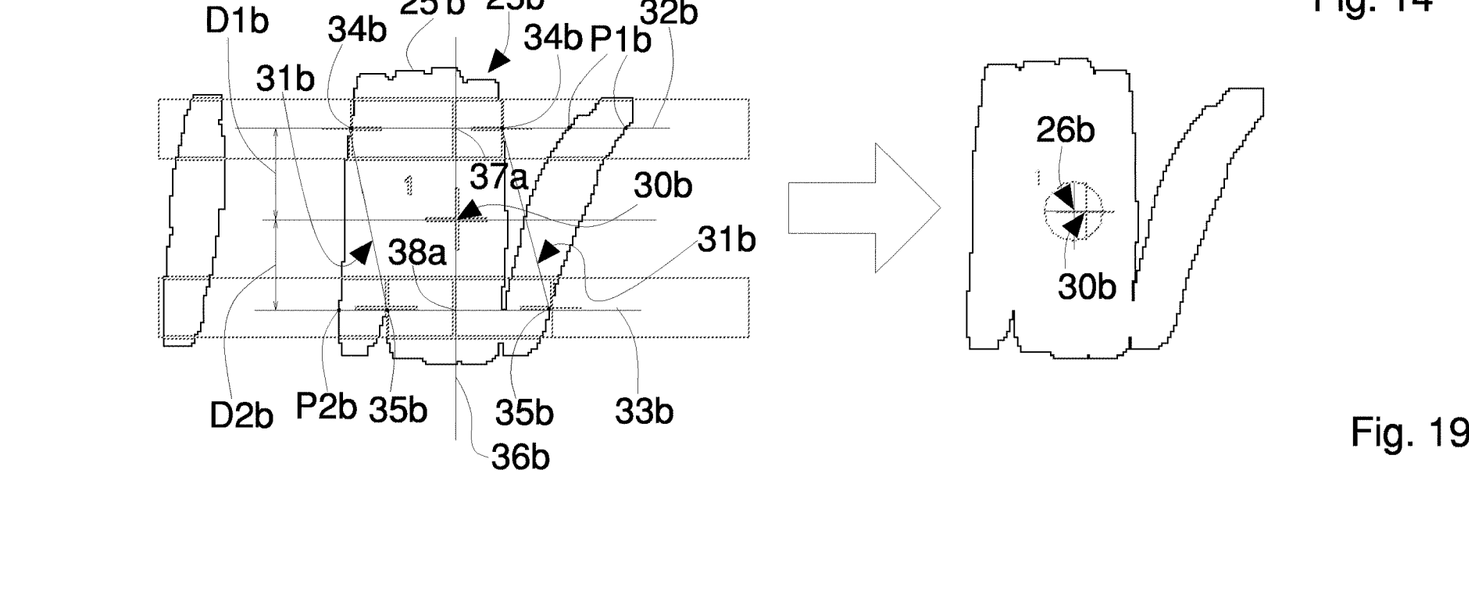
FIG. 19 shows a second region, associable with a second group of contact coils, identified in the image of FIG. 13, which is processed according to the inspection method of the present invention to calculate a respective second reference center.
Figure 20:
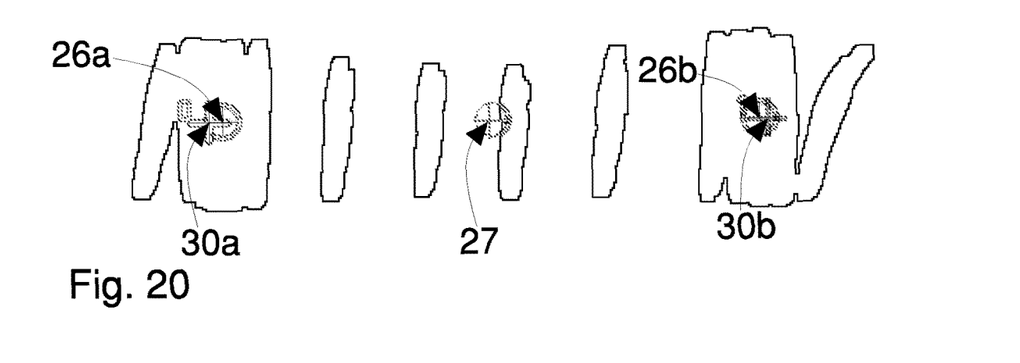
FIG. 20 shows the image of FIG. 13, as processed to calculate a center of the heating member.

For each closed region, the step of selecting two points of the upper set and two points of the lower set comprises the following steps:

identifying a central line, in detail a first central line 36a and a second central line 36b, which is perpendicular to the upper line and to the lower line and passes through the center of gravity, in detail the first central line 36a is perpendicular to the first upper line 32a and to the first lower line 33a whereas the second central line 36b is perpendicular respectively to the second upper line 32b and to the second lower line 33b (FIGS. 14 and 19);

identifying an upper center which is an intersection point between the respective upper line and the central line and a lower center, which is an intersection point between the lower line and the central line, in detail a first upper intersection center 37a between the first upper line 32a and the first central line 36a, a first lower intersection center 38a between the first lower line 33a and the first central line 36a and a second upper intersection center 37b between the second upper line 32b and the second central line 36b and a second lower intersection center 38b between the second lower line 33b and the second central line 36b;

selecting, between the points of the upper set, upper transition points, which correspond to transitions from an inside to an outside of the closed region running along the upper line away from the upper center both in a first direction T' and in a second direction T", opposite the first direction T' (FIGS. 15 to 18, which show the processing of the acquired image for the first closed region 25a), i.e. selecting first upper transition points sliding along the first upper line 32a away from the first upper center 37a and second upper transition points sliding along the second upper line 32b away from the second upper center 37b both in the first direction T' and in the second direction T";

selecting between the upper transition points the two points nearest the upper center as two vertices of the respective convex quadrangle, in detail selecting between the first upper transition points the two points nearest the first upper center 37a and between the second upper transition points the nearest two points to the second upper center 37b respectively as the first two vertices of the first convex quadrangle 31a and as the first two vertices of the second convex quadrangle 31b;

selecting, between the points of the lower set, lower transition points, which correspond to transitions from the inside to the outside of the closed region sliding along the lower line away from the lower center both in a first direction T' and in a second direction T", the second direction T" being opposite the first direction T', in detail selecting the first lower transition points sliding along the first lower line 32b away from the first lower center 38a and the second lower transition points sliding along the first second lower line 33b away from the second lower center 38b both in the first direction T' and in the second direction T";

selecting between the lower transition points the two points nearest the first lower center as the remaining two vertices of the convex quadrangle, in detail selecting between the first lower transition points the two points nearest the first lower center 38a and selecting from the second lower transition points the nearest two points to the second lower center 38b respectively as the remaining two vertices of the first convex quadrangle 31a and as the remaining two vertices of the second convex quadrangle 31b.

Before applying the processing method to the acquired image of the heating member, as disclosed so far, the acquired image is initially processed so that the steps disclosed above are simpler and faster.

Figure 21:
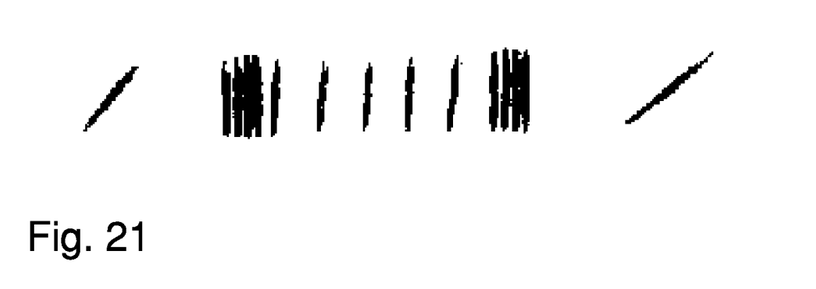
FIGS. 21 to 23 show an image of a different heating member, as processed in subsequent steps of the method of the present invention.
Figure 22:
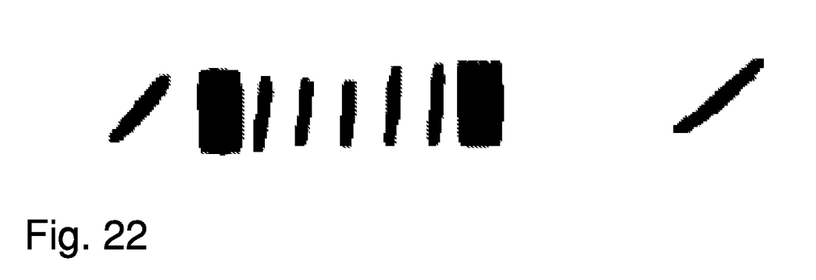
Figure 23:
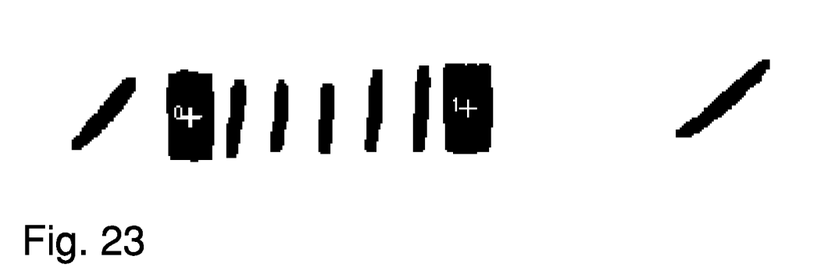

In detail, an initial step of processing an acquired image of the heating member is provided, which comprises the following steps, illustrated in FIGS. 21 to 24:

applying a first filter to the acquired image to make the coils of the heating element distinguishable from a background (it should be noted that after the application of the first filter as represented in FIG. 21, the coils of the heating element 10 are distinguished from one another and a first group of contact coils 18a and a second group of contact coils 18b can be noted, which are at a closer distance from one another than the heating coils 19);

applying a second filter to the transformed image by the first filter, to expand the dimension of each coil of the heating member and obtain a plurality of closed zones of different dimensions (it should be noted that after the application of the second filter as represented in FIG. 22, the coils of the heating element in the first group of contact coils 18a and in the second group of contact coils 18b are indistinguishable from one another i.e. a plurality of closed zones of different dimensions, of uniform color are present);

selecting the two closed zones of greater dimensions in the processed image as the first closed region 25a and the second closed region 25b, associable with the first group of contact coils 18a and with the second group of contact coils 18b (it should be noted that in FIG. 23 the two closed zones of greater dimensions are selected and indicated by "0" and "1").

The step of applying the first filter preferably comprises the step of applying a color selection filter.

The step of applying the second filter preferably comprises the step of applying a color expansion filter.

Other types of filter are optionally possible, like a first filter and/or like a second filter, for example: 1 bit binarization or posterization (reduction to just black and white, with a preset threshold on a scale of greys), Sobel contour search filter, filter sharpening increase of contrast of edge (increase of definition).

Again with reference to FIGS. 21 to 24, which illustrate the method of the present invention for calculating the center of the heating member, it should be noted that the more compact that the windings of the coils in the first group of contact coils 18a and in the second group of contact coils 18b of FIG. 21 are and the fewer "open" coils there are, the more, for each closed region 25a, 25b associable respectively in FIG. 24 with the first group of contact coils 18a and with the second group of contact coils 18b, the center of gravity 30a and 30b coincides with the respective reference center 26a, 26b calculated by the method of the present invention.

FIG. 23 shows in fact the first center of gravity 30a calculated for the first closed region 25a (the first center of gravity indicated by a symbol "+"), and the second center of gravity 30b calculated for the second closed region 25b (again, the second center of gravity indicated by the symbol "+").

Figure 24:
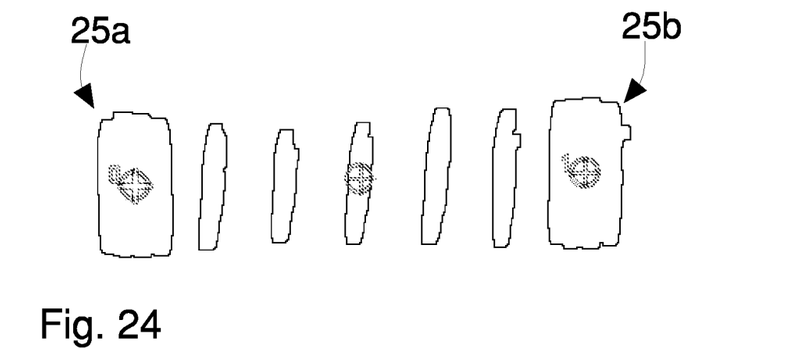
FIG. 24 shows the image of FIG. 21, as processed to calculate a center of the heating member.

FIG. 24 shows the first outline 25'a and the second outline 25'b as delimiting the first closed region 25a and the second closed region 25b.

It should be noted that the first center of gravity 30a and the second center of gravity 30b (also indicated in the respective closed region by a "+") are substantially superimposed on the first reference center 26a and on the second reference center 26b (indicated in each closed region 25a and 25b with a circumference the center of which corresponds to the corresponding reference center 26).

In fact, the convex quadrangle (not shown) of each closed region 25a, 25b coincides substantially with the closed region 25a, 25b.

The method for inspecting a heating member of an electronic cigarette can be advantageously integrated into a method for producing a cartridge 3 of an electronic cigarette.

For example, the method for producing a cartridge 3 of a device for generating inhalable vapors 1 from a liquid product can comprise the following steps:

supplying a heating member of the cartridge 3, the heating member being provided with a heating element 10 wound in coils about a wick 9 and being configured so as to define a first group of contact coils 18a representing the first contact terminal and a second group of contact coils representing a second contact terminal;

supplying a support base 4 of the cartridge 3 provided with a first power electrode 6a and with a second power electrode 6b;

coupling by welding respectively the first contact terminal 18a with the first power electrode 6a and the second contact terminal 18b with the second power electrode 6b;

and wherein the method further comprises, before the coupling by welding, the steps of inspecting the heating member by the inspection method illustrated previously, for calculating a reference center 27 of the heating member.

By exploiting the reference center 27 thus calculated, it is possible to align said reference center 27 on a preset power center of the power electrodes 6a and 6b, to permit precise coupling of the terminals of the heating member with the power electrodes 6a and 6b fixed to the support base 4.

Further, it is also possible to check whether the heating member is to be rejected if the reference center 27 is positioned in such a manner that the coupling with the power electrodes 6a and 6b is not possible because the first group of contact coils 18a and the second group of contact coils 18b are too far away or too near one another with respect to the distance between the power electrodes 6a and 6b, and thus at least one of the groups of contact coils 18a, 18b does not manage to contact the respective power electrode on which it should be superimposed.

Owing to the inspection method of the present invention, it is accordingly possible to calculate a reference center 27 of the heating member very precisely, inasmuch as the reference center 27 that is thus calculated takes account of the shape of the first group of contact coils 18a and of the shape of the second group of contact coils 18b.

It is nevertheless added that the calculated reference center 27 is not influenced by the possible imprecisions of the winding of the heating element 10 around the wick 9, the so-called "open coils", inasmuch as calculating the convex quadrangle inscribed in each closed region simplifies the shape of the closed region so as to identify compact groups of contact coils, in which adjacent coils are contiguous with one another, enclosable inside each quadrangle 31.

Owing to the first filter and to the second filter that are applied to an acquired image that make the coils distinguishable and further expand zones that are associable with adjacent coils, it is possible to identify closed regions which correspond to the coils of the heating element 10 and, between the latter, it is possible to identify with certainty the first group of contact coils 18a and the second group of contact coils 18b.

Also advantageously, the inspection unit can be installed in a forming machine of a cartridge 3 for an electronic cigarette 1 to inspect a heating member arranged in an initial configuration, in which it is straight, or a heating member arranged in a final configuration, in which it has been folded.

The compactness of each optical assembly enables the position thereof alongside other control devices and operating devices of a machine to be guaranteed and guarantees the possibility of having a large number of controls of the electronic cigarette and thus high quality in the product intended for the consumer.

The invention claimed is:

1. A method for inspecting a heating member being part of a cartridge of a device for generating inhalable vapors from a vaporizable liquid product, the method including the following steps:

processing an acquired image, which is obtained by framing the heating member;

identifying in the processed image a first closed region being associable to a first group of contact coils of the heating element, the heating element being wound in coils about a wick, the first group of contact coils representing a first contact terminal configured to contact a respective first power electrode of the cartridge;

identifying in the processed image a second closed region being associable to a second group of contact coils of the heating element, the second group of contact coils representing a second contact terminal configured to contact a respective second power electrode of the cartridge;

calculating for the first closed region a respective first reference center of the coils and calculating for the second closed region a respective second reference center of the coils;

calculating a reference center of the heating member being arranged between the first group of contact coils and the second group of contact coils, starting from the first reference center and from the second reference center;

using the reference center of the heating member to couple the first contact terminal and the second contact terminal of the heating member respectively to the first power electrode and the second power electrode of the cartridge, during a production step of the cartridge.

2. The method according to claim 1, wherein, for each closed region, the steps of calculating the first reference center and the second reference center of the coils include the following steps:

calculating a, respective first center of gravity of the first closed region and a respective second center of gravity of the second closed region, identifying a respective first outline delimiting the first closed region and a respective second outline delimiting the second closed region;

identifying a first convex quadrangle being inscribed in the first outline and a second convex quadrangle being inscribed in the second outline, the first convex quadrangle being a function of the first calculated center of gravity and the second convex quadrangle being a function of the second calculated center of gravity;

calculating the first reference center of the coils as an intersection between opposite diagonals of the first convex quadrangle and the second reference center of the coils as an intersection between opposite diagonals of the second convex quadrangle, or calculating the first reference center of the coils as a center of gravity of the first convex quadrangle and the second reference center of the coils as a center of gravity of the second convex quadrangle.

3. The method according to claim 2, wherein, for each closed region, the step of identifying the first convex quadrangle and the second convex quadrangle includes the following steps:

selecting a first upper line and a first lower line being arranged on opposite sides with respect to the first center of gravity, and selecting a second upper line and a second lower line being arranged on opposite sides with respect to the second center of gravity, which are parallel to a longitudinal axis of the wick, wherein the first upper line is arranged at a first upper distance from the first center of gravity and the second upper line is arranged at a second upper distance from the second center of gravity, wherein the first lower line is arranged at a first lower distance from the first center of gravity and the second lower line is arranged at a second lower distance from the second center of gravity;

identifying a first upper set of intersection points between the first outline and the first upper line, and identifying a second upper set of intersection points between the second outline and the second upper line;

identifying a first lower set of intersection points between the first outline and the first lower line, and identifying a second lower set of intersection points between the second outline and the second lower line;

selecting two points of the first upper set of points and two points of the first lower set of points as vertexes of the first convex quadrangle, and selecting two points of the second upper set of points and two points of the second lower set of points as vertexes of the second convex quadrangle.

4. The method according to claim 3, wherein, for each closed region the step of selecting two points of the first upper set, two points of the first lower set, two points of the second upper set, and two points of the second lower set includes the following steps:

identifying a first central line which is perpendicular to the first upper line and to the first lower line and passes through the first center of gravity, and identifying a second central line which is perpendicular to the second upper line and to the second lower line and passes through the second center of gravity;

identifying a first upper intersection center between the first upper line and the first central line and a first lower intersection center between the first lower line and the first central line, and identifying a second upper intersection center between the second upper line and the second central line and a second lower center between the second lower line and the second central line;

selecting, among the first upper set of points, first upper transition points by scanning the first upper line while moving away from a first upper center both in a first direction and in a second direction, and selecting, among the second upper set of points, second upper transition points by scanning the second upper line while moving away from a second upper center both in the first direction and in the second direction, wherein the second direction is opposite the first direction;

selecting, among the first upper transition points, the two points nearest to the first upper center as first two vertexes of the first convex quadrangle, and selecting, among the second upper transition points, the two points nearest to the second upper center as first two vertexes of the second convex quadrangle;

selecting, among the first lower set of points, first lower transition points by scanning the first lower line while moving away from a first lower center both in the first direction and in the second direction, and selecting, among the second lower set of points, second lower transition points by scanning the second lower line while moving away from a second lower center both in the first direction and in the second direction;

selecting, among the first lower transition points the two points nearest to the first lower center as the remaining two vertexes of the first convex quadrangle, and selecting, among the second lower transition points, the two points nearest to the second lower center as the remaining two vertexes of the second convex quadrangle.

5. The method according to claim 4, wherein said step of processing the acquired image of the heating member includes the following steps:

applying a first filter to the acquired image in order to make the coils of the heating element distinguishable with respect to a background;

applying a second filter to the image transformed by means of the first filter, in order to expand a dimension of each coil of the heating member and obtain a plurality of closed zones having different dimensions; and selecting two closed zones having the greatest dimensions in the processed image as the first closed region and the second closed region.

6. The method according to claim 3, wherein said step of processing the acquired image of the heating member includes the following steps:

applying a first filter to the acquired image in order to make the coils of the heating element distinguishable with respect to a background;

applying a second filter to the image transformed by means of the first filter, in order to expand a dimension of each coil of the heating member and obtain a plurality of closed zones having different dimensions; and selecting two closed zones having the greatest dimensions in the processed image as the first closed region and the second closed region.

7. The method according to claim 2, wherein said step of processing the acquired image of the heating member includes the following steps:

applying a first filter to the acquired image in order to make the coils of the heating element distinguishable with respect to a background;

applying a second filter to the image transformed by means of the first filter, in order to expand a dimension of each coil of the heating member and obtain a plurality of closed zones having different dimensions; and selecting two closed zones having the greatest dimensions in the processed image as the first closed region and the second closed region.

8. The method according to claim 1, wherein said step of processing the acquired image of the heating member includes the following steps:

applying a first filter to the acquired image in order to make the coils of the heating element distinguishable with respect to a background;

applying a second filter to the image transformed by means of the first filter, in order to expand a dimension of each coil of the heating member and obtain a plurality of closed zones having different dimensions; and selecting two closed zones having the greatest dimensions in the processed image as the first closed region and the second closed region.

9. The method according to claim 8, wherein the step of applying the first filter includes a step of applying a color selection filter.

10. The method according to claim 9, wherein the step of applying the second filter includes a step of applying a color expansion filter.

11. The method according to claim 8, wherein the step of applying the second filter includes a step of applying a color expansion filter.

* * * * *